(12) United States Patent
Matsushita (10) Patent No.: US 10,061,126 B2
(45) Date of Patent: Aug. 28, 2018

(54) OPTICAL DEVICE

(71) Applicant: YAZAKI CORPORATION, Tokyo (JP)

(72) Inventor: Junichi Matsushita, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/078,556

(22) Filed: Mar. 23, 2016

(65) Prior Publication Data

US 2016/0282616 A1    Sep. 29, 2016

(30) Foreign Application Priority Data

Mar. 24, 2015   (JP) ................................ 2015-061107

(51) Int. Cl.
| | | |
|---|---|---|
| *G02B 27/14* | (2006.01) | |
| *G02B 27/10* | (2006.01) | |
| *G02B 27/01* | (2006.01) | |
| *G02B 3/08* | (2006.01) | |

(52) U.S. Cl.
CPC ........... *G02B 27/0101* (2013.01); *G02B 3/08* (2013.01); *G02B 2027/011* (2013.01); *G02B 2027/013* (2013.01); *G02B 2027/0129* (2013.01)

(58) Field of Classification Search
USPC .................................................. 359/619–636
See application file for complete search history.

(56) References Cited

U.S. PATENT DOCUMENTS

| | | | |
|---|---|---|---|
| 3,711,188 A | * | 1/1973 | Zehnpfennig .......... G03B 21/11 352/61 |
| 6,236,511 B1 | | 5/2001 | Brown |
| 2003/0053206 A1 | | 3/2003 | Togino |
| 2009/0190102 A1 | | 7/2009 | Aruga |
| 2015/0316228 A1 | * | 11/2015 | Saito ...................... F21V 5/045 362/311.06 |

FOREIGN PATENT DOCUMENTS

| | | |
|---|---|---|
| JP | 63-284501 A | 11/1988 |
| JP | 6-63810 A | 3/1994 |
| JP | 9-236701 A | 9/1997 |
| JP | 2002-311377 A | 10/2002 |

(Continued)

OTHER PUBLICATIONS

Japanese Office Action for the related Japanese Patent Application No. 2015-061107 dated Mar. 27, 2017.

(Continued)

*Primary Examiner* — Brandi Thomas
(74) *Attorney, Agent, or Firm* — Kenealy Vaidya LLP (57) ABSTRACT

An optical device includes a plate-shaped Fresnel lens portion made of a first optical material, the Fresnel lens portion having a Fresnel-shaped portion on one side of Fresnel lens portion in a thickness direction of the Fresnel lens portion, the Fresnel-shaped portion having a plurality of grooves, and a partially reflective mirror layer provided on a surface of the Fresnel-shaped portion. The plurality of grooves of the Fresnel-shaped portion is configured such that a surface configuration of the Fresnel-shaped portion has optically freeform surface characteristics and such that each of the grooves has a non-uniform depth.

11 Claims, 6 Drawing Sheets

(56) References Cited

FOREIGN PATENT DOCUMENTS

| | | | | |
|---|---|---|---|---|
| JP | 2009-206078 A | | 9/2009 | |
| JP | 2012-123393 | * | 12/2011 | ............... G02B 3/08 |
| JP | 2012-123393 A | | 6/2012 | |
| WO | 2014/041689 A1 | | 3/2014 | |

OTHER PUBLICATIONS

Japanese Office Action for the related Japanese Patent Application No. 2015-061107 dated Oct. 31, 2017.
Japanese Decision of Refusal for the related Japanese Patent Application No. 2015-061107 dated Jun. 5, 2018.
Japanese Decision to Decline the Amendment for the related Japanese Patent Application No. 2015-061107 dated Jun. 5, 2018.

* cited by examiner

| X | Y | Z | θ (°) | φ (°) |
|---|---|---|---|---|
| -130.000 | -130.000 | -1.634E + 01 | 23.311 | 10.791 |
| -130.000 | -125.000 | -1.598E + 01 | 23.357 | 10.693 |
| -130.000 | -120.000 | -1.569E + 01 | 23.409 | 10.543 |
| -130.000 | -115.000 | -1.530E | | 10.461 |

*OUTPUT DATA (FIVE AXES)*

*- X, Y, Z COORDINATES*

*- θ (NORMAL VECTOR)*

*- φ (FRESNEL ANGLE)*

FIG. 6

OPTICAL DEVICE

CROSS-REFERENCE TO RELATED APPLICATIONS

The present application claims priority from Japanese Patent Application No. 2015-061107 filed on Mar. 24, 2015, the entire content of which is incorporated herein by reference.

FIELD OF INVENTION

The present invention relates to an optical device for display light projection having such characteristics as to reflect, by its one surface, display light emitted from a display unit and to project resulting reflection light for projection at an eye point and to transmit external light incident on the other surface.

RELATED ART

For example, in general vehicular head-up display (HUD) devices, an optical image containing various information to be displayed is projected from an HUD unit onto a windshield (front window glass) or a reflection plate called a combiner and an optical path is formed so that light reflected from the windshield, for example, goes toward the viewing point of a driver. Therefore, the driver can view, as a virtual image, HUD visual display information displayed on the windshield, for example, while seeing a scene ahead of the vehicle through the windshield. That is, the driver can visually recognize various information in the form of an HUD display without the need for turning his or her eyes while keeping an ordinary driving state.

For example, according to a related art, a special optical device (the combiner) is bonded to a glass surface of a windshield (see, e.g., JP 2012-123393A). Light emitted from an HUD unit is reflected by the surface of the optical device formed on the windshield and goes toward the eye point of a driver. Since the optical device is made of a material that transmits visible light, the driver can not only view a displayed image that is displayed in front of the optical device as a virtual image but also see an image of a scene ahead of the vehicle, through the windshield and the optical device.

In this related art, a magnifying optical system is formed by placing a Fresnel lens on the optical device. This makes it possible to reduce the size of the HUD unit. Furthermore, the use of the Fresnel lens makes it possible to reduce the thickness of the optical device.

Conventional Fresnel lens portions have a shape that circular Fresnel grooves are arranged in a concentric manner. This shape can provide reflecting surface characteristics corresponding to a spherical surface or a rotationally symmetrical aspherical surface. Being rotationally symmetrical, this kind of shape can be produced relatively easily using a machine tool such as a lathe.

However, such Fresnel lens portions cannot provide reflecting surface characteristics of a polynomial aspherical surface because each Fresnel groove has a relatively simple spherical surface or rotationally symmetrical aspherical surface. Therefore, a portion, distant from the center, of a Fresnel lens portion produces distortion and thereby lower the imaging performance. Furthermore, conspicuous binocular parallax occurs for certain lines of sight of a driver. Where a magnifying optical system of an HUD device is constructed by placing a Fresnel lens portion on a windshield or a combiner, the influence of distortion due to the optical system etc. cannot be avoided because the Fresnel lens portion is disposed parallel with the curved surface of the windshield or combiner.

SUMMARY

Illustrative aspects of the present invention provide an optical device that has a reflecting surface capable of being used for projection of an HUD device and an optical magnifying function and that can eliminate distortion due to a projection optical system etc.

According to an illustrative aspect of the present invention, an optical device includes a plate-shaped Fresnel lens portion made of a first optical material, the Fresnel lens portion having a Fresnel-shaped portion on one side of Fresnel lens portion in a thickness direction of the Fresnel lens portion, the Fresnel-shaped portion having a plurality of grooves, and a partially reflective mirror layer provided on a surface of the Fresnel-shaped portion. The plurality of grooves of the Fresnel-shaped portion is configured such that a surface configuration of the Fresnel-shaped portion has optically freeform surface characteristics and such that each of the grooves has a non-uniform depth.

Other aspects and advantages of the invention will be apparent from the following description, the drawings and the claims.

DETAILED DESCRIPTION

Hereinafter, exemplary embodiments of the present invention will be described in detail with reference to the drawings. However, the following exemplary embodiments do not limit the scope of the claimed invention.

Example of Use Environment of Display Light Projection Optical Device

Figure 1:
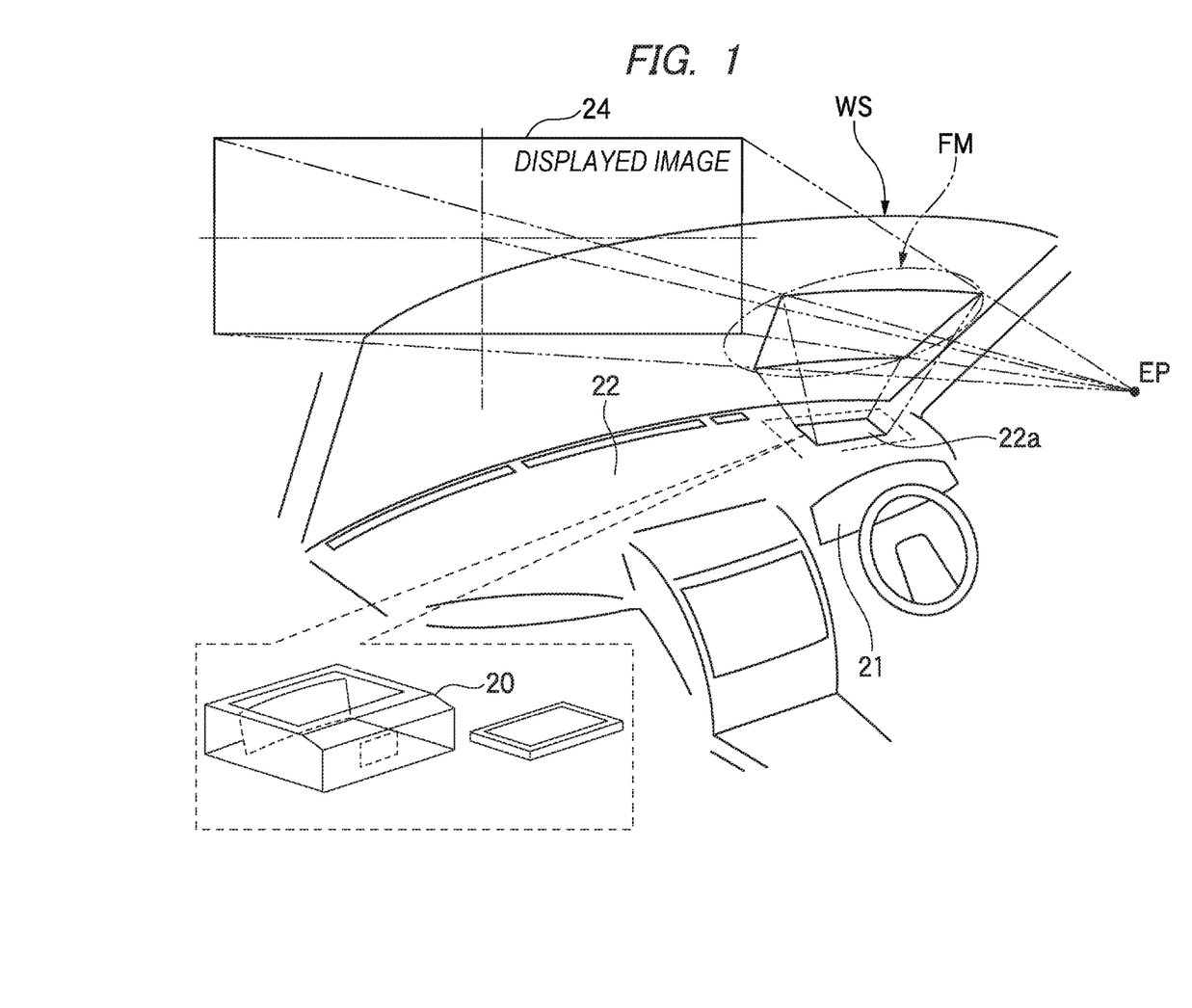
FIG. 1 is a perspective view, as viewed from inside a vehicle compartment, of a windshield and its neighborhood of a vehicle in which a display light projection optical device according to an exemplary embodiment is installed.
Figure 2:
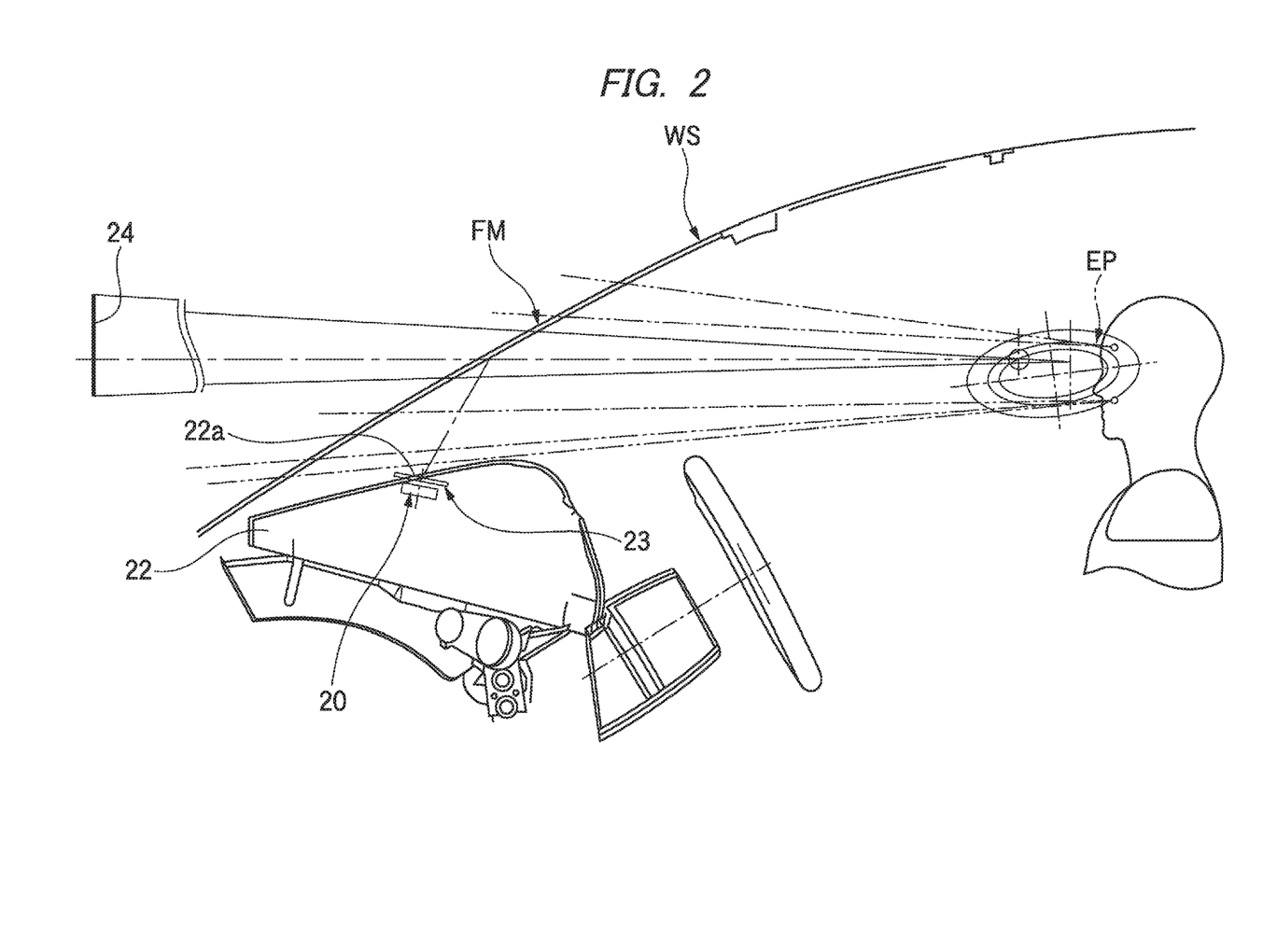
FIG. 2 is a vertical sectional view as viewed from the same side as FIG. 1.

FIG. 1 is a view, as viewed obliquely from inside a vehicle compartment, of a windshield WS and its neighborhood of a vehicle in which a display light projection optical device according to an exemplary embodiment is installed. FIG. 2 is a vertical sectional view as viewed from the same side as FIG. 1 is, and shows how individual components and units are arranged.

In the example of FIGS. 1 and 2, a windshield WS (window glass) of the vehicle which is a laminated glass incorporates, as an intermediate layer, a display light projection optical device. A Fresnel lens portion region FM is formed in the display light projection optical device. The Fresnel lens portion region FM basically has a half-mirror function: the Fresnel lens portion region FM has such characteristics as to reflect light that shines on the Fresnel lens portion region FM from inside the vehicle compartment and to transmit light that goes rightward in FIG. 2 and shines on the Fresnel lens portion region FM from outside the vehicle. Like a Fresnel lens, the Fresnel lens portion region FM forms a magnifying optical system. A specific configuration of the display light projection optical device will be described later in detail.

Although the example of FIGS. 1 and 2 assumes that the display light projection optical device is incorporated in the windshield WS, the display light projection optical device may be disposed near the windshield WS as a combiner of an HUD (head-up display) device independently of the windshield WS.

In the vehicle shown in FIG. 1, an HUD unit 20 is disposed under a dashboard 22 in front of a meter unit 21. The HUD unit 20 has, inside, a flat panel display such as a liquid crystal display and illumination light source (backlight). When necessary, various information that is useful for driving, such as a vehicle speed, is displayed on the screen of the flat panel display in the form of visible information such as characters, numerals, and symbols. By illuminating the screen by the backlight, the HUD unit 20 can emit display light carrying an image of displayed visible information.

The dashboard 22 is formed with a rectangular opening 22a over the HUD unit 20. Display light that is emitted from the HUD unit 20 goes toward a portion, located over it, of the windshield WS through the opening 22a. The above-mentioned Fresnel lens portion region FM is disposed in the portion, on which display light coming from the HUD unit 20 shines, of the windshield WS.

Therefore, display light that is emitted from the HUD unit 20 shines on the surface of the windshield WS, is reflected by the Fresnel lens portion region FM, and reaches an eye point EP which corresponds a presumed position of the eyes of a driver. Since the display light is reflected by the Fresnel lens portion region FM, the driver sees a displayed image as a virtual image that seems as if to be displayed in a virtual imaging plane 24 that is located in front of the windshield WS (distant from it by about 10 m, for example). Since like the windshield WS the Fresnel lens portion region FM transmits light that comes from forward of the vehicle toward the vehicle compartment, the driver can also see a scene ahead of the vehicle through the Fresnel lens portion region FM. That is, the driver can see a scene ahead of the vehicle and a displayed image of the HUD unit 20 at the same time in superimposition.

Employing a Fresnel lens portion, the Fresnel lens portion region FM is reduced in thickness and hence can be incorporated in the windshield WS. Since the Fresnel lens portion region FM forms a magnifying optical system, it is not necessary for the HUD unit 20 to incorporate a magnifying optical system. Furthermore, the aperture area of the opening 22a can be made smaller than in the case that the HUD unit 20 incorporates a magnifying optical system.

A louver 23 is disposed in the vicinity of the opening 22a. The louver 23 has a function of preventing unnecessary external light from being reflected in the vicinity of the opening 22a and going toward the eye point EP and thereby increasing the viewability of HUD display.

Example of Fresnel Lens Portion>

Figure 3A:
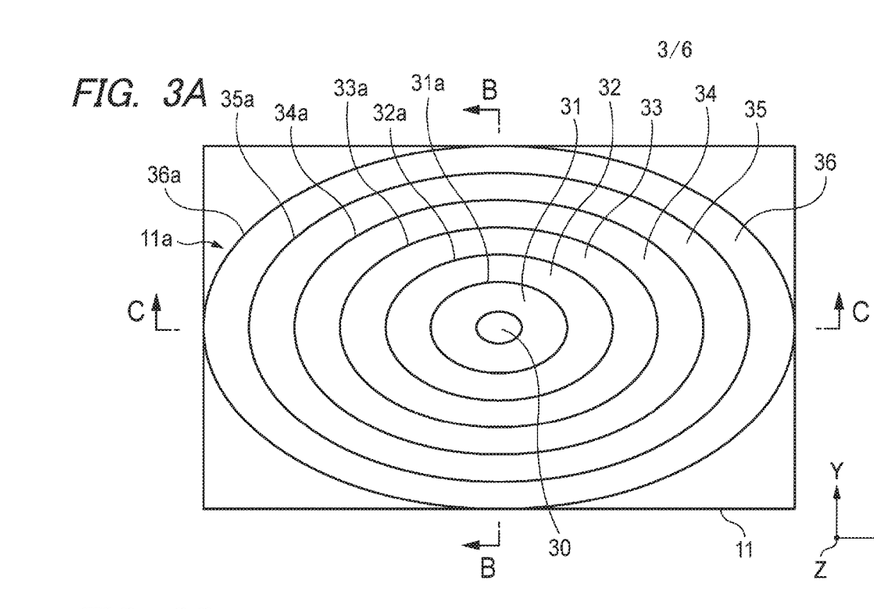
FIGS. 3A to 3C illustrate an example structure of a Fresnel lens portion that is used in the display light projection optical device according to the exemplary embodiment, FIG. 3A being a plan view, FIG. 3B being a sectional view taken along the line B-B in FIG. 3A, and FIG. 3C being a sectional view taken along the line C-C in FIG. 3A.
Figure 3B:
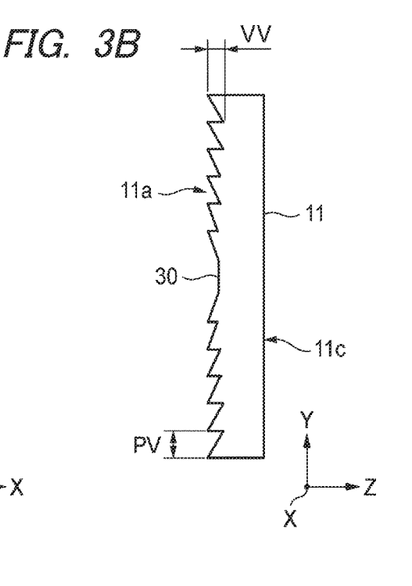
Figure 3C:
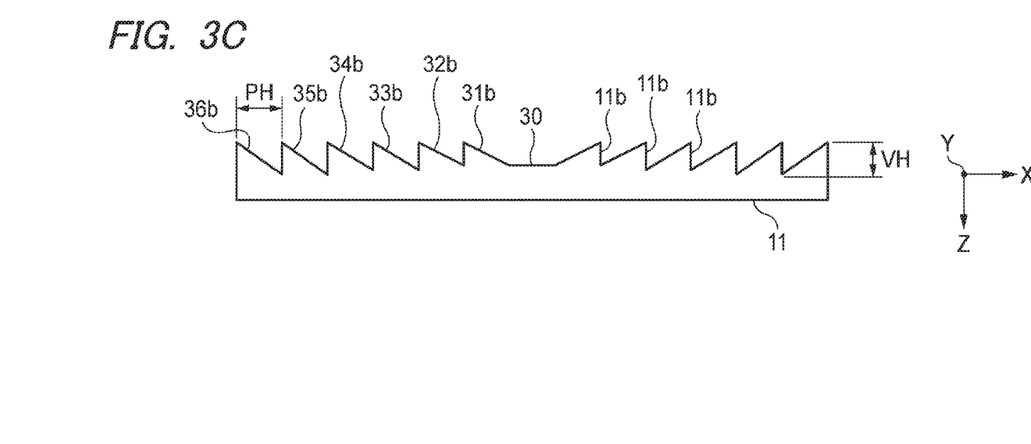

FIGS. 3A to 3C illustrate an example structure of a Fresnel lens portion 11 that is used in the display light projection optical device according to the exemplary embodiment. FIG. 3A is a plan view, FIG. 3B is a sectional view taken along line B-B in FIG. 3A, and FIG. 3C a sectional view taken along line C-C in FIG. 3A.

The Fresnel lens portion 11, which is a base member, is a thin plate made of a transparent material having a known refractive index n1 such as resin or glass. One of the surfaces, arranged in the thickness direction, of the Fresnel lens portion 11 is formed with a Fresnel-shaped portion 11a and the other surface is a flat surface 11c.

Although the exemplary embodiment is directed to a case that as shown in FIG. 3A outlines and circumferences 31a, 32a, 33a, 34a, 35a, 36a have many elliptical or approximately elliptical Fresnel grooves 31, 32, 33, 34, 35, 36, even circular Fresnel grooves 31 to 36 can suppress distortion due to the optical system by varying the inclination angle (sag angle) of each of reflecting surfaces 31b to 36b (described later) depending on the position in the circumferential direction of the groove.

It is necessary to increase or decrease the number of Fresnel grooves, the arrangement pitch, etc. according to required optical characteristics etc. The Fresnel grooves 31 to 36 are arranged in a concentric manner around a central portion 30 of the Fresnel lens portion 11.

As shown in FIGS. 3B and 3C, a projection is formed between each adjoining pair of the Fresnel grooves 31 to 36. That is, the Fresnel-shaped portion 11a has saw-tooth-shaped surfaces in cross section, and the reflecting surfaces 31b, 32b, 33b, 34b, 35b, 36b are slant surfaces that are inclined from the direction that is perpendicular to the thickness direction of the Fresnel lens portion 11. A perpendicular wall 11b is formed at the boundary between the reflecting surfaces of each adjoining pair of Fresnel grooves so as to extend in the thickness direction of the Fresnel lens portion 11. The inclined reflecting surfaces 31b-36b are formed approximately continuously so as to form no surfaces that are orthogonal to the thickness direction. This surface configuration optically forms a lens.

The Fresnel grooves 31 to 36 give the Fresnel-shaped portion 11a light reflection characteristic that are freeform surface characteristics. The reflecting surfaces 31b-36b of the Fresnel grooves 31 to 36 are formed such that the inclination angle (sag angle) of each reflecting surface varies continuously depending on the circumferential position of the groove.

Where the depth (VH, VV) of each of the Fresnel grooves 31 to 36 is made constant, the inclination angle of each of the reflecting surfaces 31b-36b is varied continuously depending on the circumferential position and the pitch (PH, PV) between the circumferences of each adjoining pairs of grooves is thereby varied depending on the circumferential position. As a result, the Fresnel grooves 31 to 36 have elliptical circumferences.

In the example of FIGS. 3A to 3C, since elliptical patterns are formed in each of which the dimension in the X-axis direction is longer than that in the Y-axis direction, the pitch PV between the circumferences 35a and 36a in the B-B cross section is shorter than the pitch PH between them in the C-C cross section. The inclination angle of the reflecting surface 36b that corresponds to the pitch PH is smaller than that corresponding to the pitch PV. It goes without saying that if the installation position of the Fresnel lens portion 11, its positional relationship with the eye point EL, or some other factor satisfies a certain condition, elliptical patterns may be formed in each of which the dimension in the Y-axis direction is longer than that in the X-axis direction.

Where the depth (VH, VV) of the groove is varied according to a variation of the inclination angle (sag angle) of each of the reflecting surfaces 31b-36b, it is possible to set the pitch (PH, PV) between the circumferences of each adjoining pairs of grooves constant. In this case, light reflection characteristics being freeform surface characteristics can be obtained even if the Fresnel grooves 31 to 36 assume perfect circles or shapes close to them.

The outline shapes of the circumferences of the Fresnel grooves 31 to 36 are not limited to elliptical shapes as shown in FIG. 3A or circular shapes, and may be curved like, for example, contour lines according to freeform surface characteristics required.

For example, in the case where a displayed image formed by an HUD display system is distorted so as to have different sizes in the vertical direction and the horizontal direction, high-quality display can be realized by suppressing image distortion or binocular parallax by employing a Fresnel lens portion 11 having elliptical patterns that are adjusted in vertical/horizontal radio. Furthermore, miniaturization can be attained because the Fresnel lens portion 11 is a thin plate.

Manufacturing Method of Fresnel Lens Portion>

Figure 5:
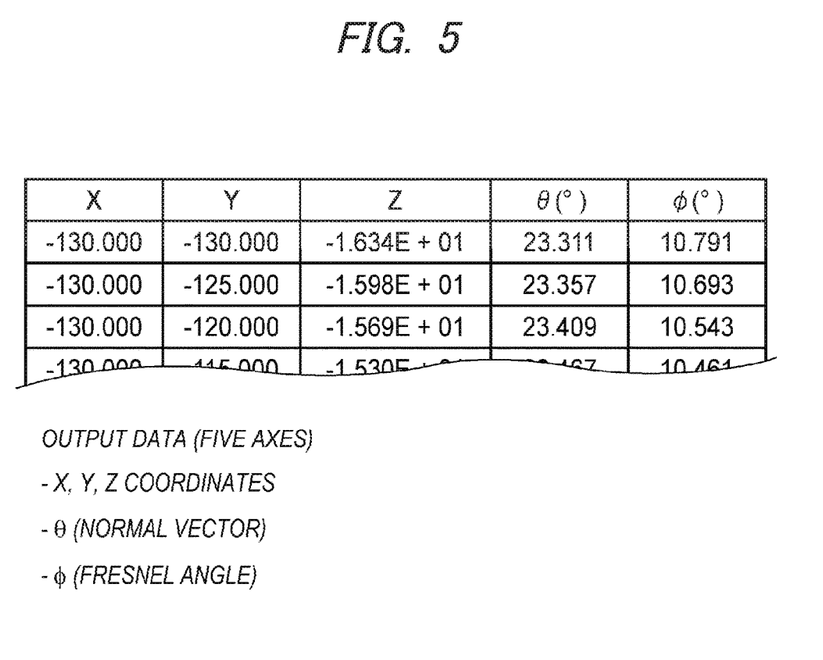
FIG. 5 shows a specific example of part of processing data to be used for producing, by machining, a Fresnel lens portion having such a Fresnel shape as to exhibit desired characteristics.

FIG. 5 illustrates a specific example of part of processing data to be used for producing, by machining, a Fresnel lens portion 11 having such a Fresnel shape as to exhibit desired characteristics. That is, processing data as shown in FIG. 5 is used in processing (i.e., shaping) a material so as to produce a Fresnel-shaped portion 11a as shown in FIG. 3C.

In actuality, processing data as shown in FIG. 5 can be generated automatically by a computer through a designing tool on the basis of parameters of a polynomial aspherical surface corresponding to freeform surface characteristics for eliminating distortion of a displayed image or binocular parallax of lines of sight utilizing an optimizing design model designed using an optical design software.

The processing data shown in FIG. 5 is 5-axis data consisting of 3-axis coordinate data representing positions in the X, Y, and Z-axis directions, normal vectors θ, and Fresnel angles ϕ. The normal vectors θ represent inclination angles of the reflecting surfaces 31b, 36b shown in FIGS. 3A to 3C at respective sets of coordinates. The Fresnel angles ϕ are sag angles.

The processing data is not limited to data in the form shown in FIG. 5, and any form of data can be used for manufacturing a proper Fresnel lens portion 11 as long as it indicates circumference shapes of the Fresnel grooves 31 to 36 shown in FIGS. 3A to 3C, inclination angles (sag angles) of the reflecting surfaces at respective sets of coordinates, and depths (sag depths) in the Z-axis direction.

Since the Fresnel-shaped portion 11a of the Fresnel lens portion 11 is very complex in shape, a necessary die is produced on the basis of processing data as shown in FIG. 5 (using a 3D processing machine, for example). A material such as resin is processed using the die thus produced so as to form the Fresnel-shaped portion 11a having the intended shape.

Overall Configuration of Display Light Projection Optical Device

Figure 4:
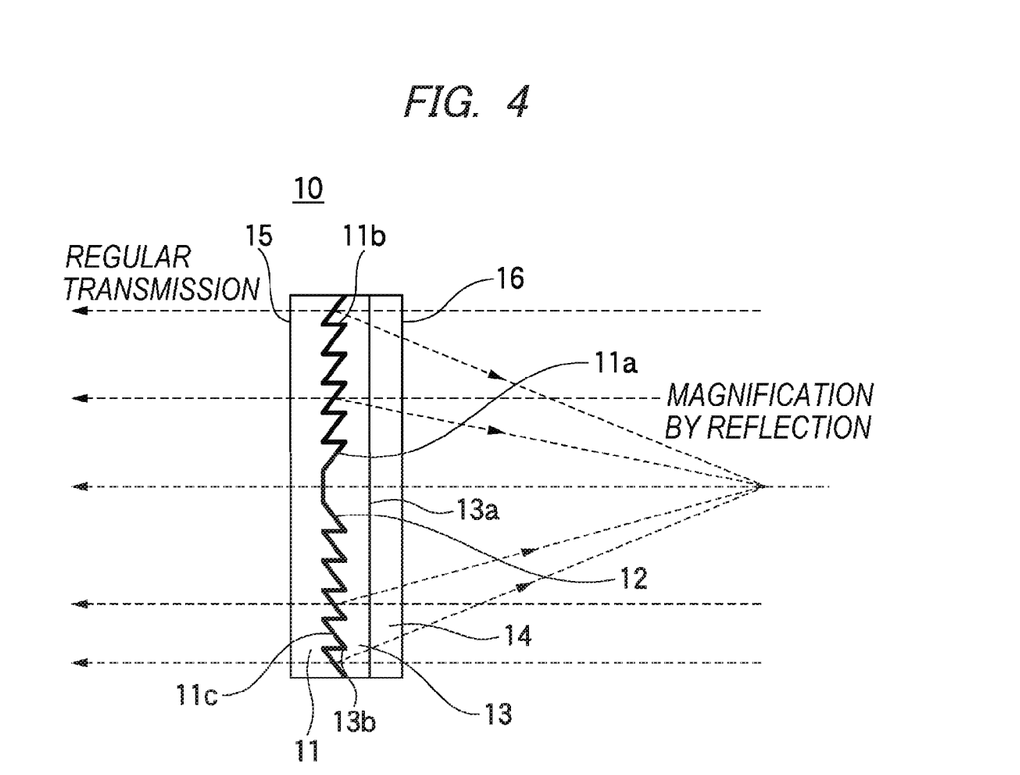
FIG. 4 is a vertical sectional view, taken along the thickness direction, of the display light projection optical device according to the exemplary embodiment.

FIG. 4 is a sectional view taken along the thickness direction, illustrating the configuration of the display light projection optical device according to the exemplary embodiment.

In the exemplary embodiment, the display light projection optical device is configured as a combiner 10 for projecting display light of the HUD unit 20. The combiner 10 is formed so as to have the same rectangular shape as the Fresnel lens portion 11 shown in FIG. 3A and to be larger in size than the Fresnel lens portion region FM shown in FIG. 1.

As shown in FIG. 4, the combiner 10 has a plurality of layers that are laid on each other in its thickness direction. More specifically, the combiner 10 has the Fresnel lens portion 11 as a base, a partially reflective mirror layer 12, a filler layer 13, a transparent plate 14, a transparent plate 14, and AR coating layers 15, 16.

The partially reflective mirror layer 12 is formed on a surface of the Fresnel-shaped portion 11a of the Fresnel lens portion 11. More specifically, the partially reflective mirror layer 12 is formed by vapor-depositing a metal or inorganic multilayer thin film on the surfaces. The partially reflective mirror layer 12 is configured to have the light reflectance of, for example, 20%. The thickness of the partially reflective mirror layer 12 formed is set smaller than 100 nm.

In the exemplary embodiment, in forming the partially reflective mirror layer 12, the perpendicular walls 11b of the Fresnel-shaped portion 11a are not subjected to the vapor deposition. That is, the partially reflective mirror layer 12 is formed on surfaces other than the perpendicular walls 11b, which are the boundaries between the grooves of the Fresnel-shaped portion 11a and extend parallel with the thickness direction. Because the partially reflective mirror layer 12 does not exist on the perpendicular walls 11b, reflection, by the perpendicular walls 11b, of light that takes a different path than regularly transmitted light or once-reflected light is suppressed, whereby the probability of occurrences of unintended light beams by such reflections is minimized. As a result, the probability of occurrence of a flare image is also lowered.

The filler layer 13 is provided to cover the projections and recesses of the Fresnel-shaped portion 11a of the Fresnel lens portion 11 and thereby produce a flat surface. The filler layer 13 is formed by charging and setting a transparent material such as an ultraviolet (UV)-curing resin. The material of the filler layer 13 is limited to only ones whose refractive indices n3 are approximately equal to the refractive index of the Fresnel lens portion 11.

A surface 13a on one side in the thickness direction of the filler layer 13 is flat, and the other surface 13b that is in close contact with the Fresnel-shaped portion 11a and the partially reflective mirror layer 12 have a surface configurations that conform to the projections and recesses of the Fresnel-shaped portion 11a.

The transparent plate 14 is provided to protect the surface of the combiner 10. The transparent plate 14 is made of a transparent material whose refractive index n2 is approximately equal to the refractive index of the Fresnel lens portion 11, and is formed as a thin plate.

As shown in FIG. 4, anti-reflection (AR) coating layers 15, 16 are formed to provide two respective outer surfaces, arranged in the thickness direction, of the combiner 10. Therefore, the reflection, by these surfaces, of light to shine on the combiner 10 and light to exit from it is suppressed.

As specific effects, the AR coating layers 15, 16 can prevent generation of a ghost image of same magnification and halation due to internal diffused reflections.

In the example of FIGS. 1 and 2, the combiner 10 shown in FIG. 4 is incorporated in and integrated with the windshield WS as an intermediate layer. That is, the partially reflective mirror layer 12 of the combiner 10 constitutes the Fresnel lens portion region FM shown in FIGS. 1 and 2. Providing optical characteristics equivalent to the optical characteristics of a Fresnel lens having optical magnification power because of the shapes of the Fresnel-shaped portion 11*a*, the partially reflective mirror layer 12 forms a magnifying optical system for incident light coming from the HUD unit 20. As a result, a virtual image can be formed at a distant position in front of the windshield WS (i.e., in the virtual imaging plane 24).

Although in the example of FIGS. 1 and 2 the combiner 10 is integrated with the windshield WS, the combiner 10 may be disposed at such a position as to be separated from the windshield WS; for example, an independent combiner 10 may be disposed over the dashboard 22 so as to be inclined.

Transmission Characteristics

FIG. 4 illustrates the combiner 10 in which all of the refractive index n1 of the material of the Fresnel lens portion 11, the refractive index n2 of the material of the transparent plate 14, and the refractive index n3 of the material of the filler layer 13 are the same. In this configuration, the refraction of light due to a refractive index difference at each of the boundary between the Fresnel lens portion 11 and the filler layer 13 and the boundary between the filler layer 13 and the transparent plate 14 can be prevented. Where the combiner 10 is installed in the windshield WS as an intermediate layer, by setting the refractive index of the material of the windshield WS equal to the refractive index n1 of the material of the Fresnel lens portion 11, part of the windshield WS can function as a transparent plate 14 (i.e., the transparent plate 14 is omitted).

Where the refractive indices are adjusted in the above described manner, at the eye point EP shown in FIG. 2 the driver visually recognizes a scene ahead of the vehicle as an image at the same magnification (no optical magnification) even if incident light passes through the Fresnel lens portion region FM. That is, no differences occur in the size, position, shape, etc. of a recognized image of a scene ahead of the vehicle between a case that it is seen through the Fresnel lens portion region FM and a case that it is seen through a region, other than the Fresnel lens portion region FM, of the windshield WS. Therefore, even if the Fresnel lens portion region FM is used, a good field of view that is necessary for driving can be secured. Furthermore, since the AR coating layers 15, 16 suppress reflection of light by the front surface and the back surface of the combiner 10, generation of a ghost image of the same magnification and halation due to internal diffused reflections can be prevented.

By disposing the combiner 10 having the magnifying optical system formed by the Fresnel lens portion 11 is disposed in or in the vicinity of the windshield WS, a virtual image having a wide viewing angle can be displayed by the HUD unit 20. Furthermore, since it is not necessary to provide a magnifying optical system in the HUD unit 20, the HUD unit 20 can be miniaturized and the area of the opening 22*a* can be reduced.

Since as described above the Fresnel-shaped portion 11*a* of the Fresnel lens portion 11 of the combiner 10 shown in FIG. 4 has the special shapes, light reflection characteristics that are freeform surface characteristics can be obtained and hence ideal lens characteristics of a polynomial aspherical surface can be realized. As a result, even without employing a large lens or mirror, the imaging performance and performance relating to binocular parallax, display distortion, etc. of the HUD system are improved and hence the display quality can be improved.

Fresnel Pitch P

In the Fresnel lens portion 11 shown in FIGS. 3A to 3C, the pitch of formation of the grooves of the Fresnel-shaped portion 11*a*, that is, the Fresnel pitch P, is set so as to be equal to an approximate value of the following equation or a smaller value.

$$P = (\tan \theta d \cdot D)/\text{Pixel}$$

θd: display angle of view

D: distance between presumed eye point and Fresnel-shaped portion

Pixel: number of vertical or horizontal pixels on display screen of HUD unit 20

For example, assume a case that the number of vertical or horizontal pixels on the screen of the flat panel display disposed inside the HUD unit 20 is 640 pixels, the display angle of view θd is equal to 16 deg., and the distance D is equal to 1,000 mm. In this case, a setting P=0.45 mm is made according to the above Equation.

By setting the Fresnel pitch P of the Fresnel-shaped portion 11*a* in the above manner, a displayed image that the driver views at the eye point EP is given an ability of displaying a minimum necessary number of dot pixels that is required by the HUD unit 20. It also becomes possible to prevent color separation (generation of rainbow colors) and generation of a ghost such as a double image due to diffraction at the Fresnel edges and to lower the probability of occurrence of a flare image due to diffused reflection.

Modification

Figure 6:
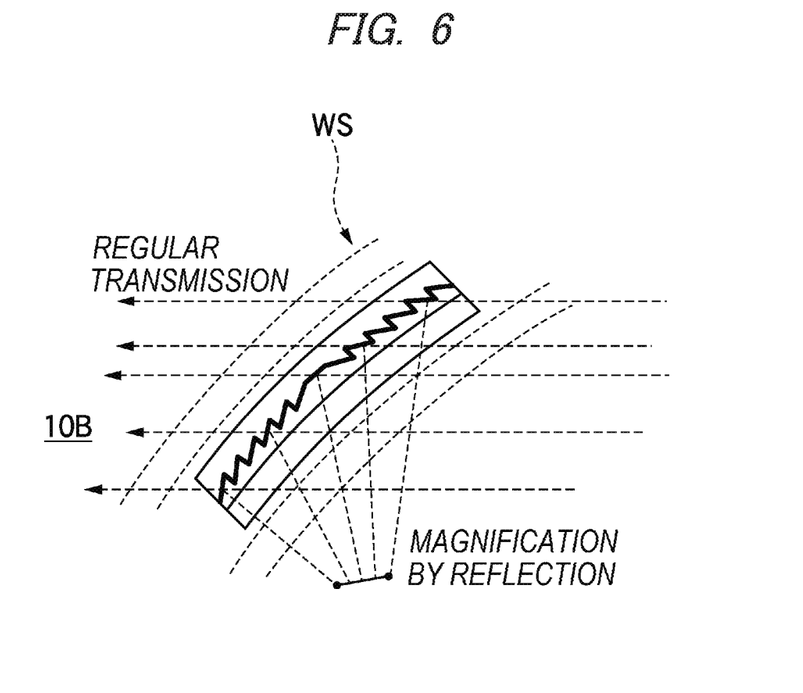
FIG. 6 is a vertical sectional view showing the shape of a display light projection optical device according to a modified example.

FIG. 6 shows a sectional shape of a combiner 10B (display light projection optical device) according to a modified example.

Where the combiner 10 is realized as an intermediate layer of the windshield WS in the manner shown in FIGS. 1 and 2, to optimize the HUD display quality, it is desirable to change the combiner shape to a curved one as of a combiner 10B shown in FIG. 6.

In the combiner 10B shown in FIG. 6, in optical designing the radius of curvature (of a base curve) of the Fresnel surface is determined according to a spherical surface represented by a certain radius R or a polynomial aspherical surface so as to be suitable for the curved surface shape specific to the windshield WS. As in the Fresnel lens portion 11 shown in FIGS. 3A to 3C, the circumferences of the Fresnel grooves 31 to 36 are made elliptical or the inclination or depth of each of the reflecting surfaces 31*b*-36*b* is varied continuously depending on the circumferential position. In determining a base shape of the Fresnel-shaped portion 11*a*, a calculation is made taking the curved surface shape specific to the windshield WS into consideration.

As a result, even in a case that a field ahead is seen through the Fresnel lens portion region FM with improved HUD display quality, transparent visibility of the same level as in a case of viewing through a normal windshield WS can be provided.

Summarized below are some features of the combiner 10 according to the exemplary embodiment of the present invention.

An optical device includes a plate-shaped Fresnel lens portion (11) made of a first optical material, the Fresnel lens portion having a Fresnel-shaped portion (11*a*) on one side of Fresnel lens portion in a thickness direction of the Fresnel lens portion, the Fresnel-shaped portion having a plurality of grooves, and a partially reflective mirror layer (12) provided on a surface of the Fresnel-shaped portion. The plurality of grooves of the Fresnel-shaped portion is configured such that a surface configuration of the Fresnel-shaped portion has optically freeform surface characteristics and such that each of the grooves has a non-uniform depth.

According to this optical device, since the partially reflective mirror layer is formed on the surface of the Fresnel-shaped portion, a magnifying optical system is formed for the light that is being reflected. The freeform surface characteristics may be provided by continuously varying the angle of the reflecting surface of each groove in accordance with the position on the circumference along the groove, whereby three-dimensional distortion due to the optical system etc. can be eliminated.

The optical device may be configured as a display light projection device (combiner 10), and the Fresnel lens portion (11) may be configured to reflect display light emitted from a display unit (HUD unit 20) at a position in the vicinity of the one side of the Fresnel lens portion to project the light toward an eye point (EP), and to transmit, in the thickness direction, external light entering the Fresnel lens portion from another side of the Fresnel lens portion.

According to this optical device, the display light emitted from the display unit is reflected by the surface of the partially reflective mirror layer and is directed toward the eye point of a driver. On the other hand, the external light coming from forward of the vehicle passes through the display light projection optical device and is directed toward the eye point. Formed on the surface of the Fresnel-shaped portion, the partially reflective mirror layer forms a magnifying optical system for the light that is being reflected. Again, the freeform surface characteristics may be provided by continuously varying the angle of the reflecting surface of each groove in accordance with the position on the circumference along the groove, whereby three-dimensional distortion due to the optical system etc. can be eliminated.

Each of the grooves may be configured such that an angle of a reflecting surface thereof varies continuously depending on a position on a circumference along the groove.

This makes it possible to easily provide the freeform surface characteristics that are necessary for eliminating three-dimensional distortion due to various factors.

Each of the grooves of the Fresnel-shaped portion may be configured have a ring shape such that at least a distance from a central portion (30) of the Fresnel-shaped portion to the circumference (31a-36a) along the groove varies continuously depending on the position on the circumference.

According to this optical device, since the distance from the central portion of the Fresnel-shaped portion to the circumference along each groove varies continuously depending on the position on the circumference, even in the case where each groove has a constant depth, a shape that is necessary for obtaining freeform surface characteristics can be obtained at each portion of the reflecting surface by adjusting the inclination angle of the reflecting surface depending on the position.

Each of the grooves (Fresnel grooves 31 to 36) of the Fresnel-shaped portion have an elliptical shape.

According to this optical device, since each groove assumes an elliptical shape, the distance from the central portion of the Fresnel-shaped portion to the circumference along each groove varies continuously depending on the position on the circumference. Therefore, even in the case where each groove has a constant depth, a shape that is necessary for obtaining freeform surface characteristics can be obtained at each portion of the reflecting surface by adjusting the inclination angle of the reflecting surface depending on the position.

The optical device may further include a second optical material (filler layer 13) as a transparent filler that fills projections and recesses of a surface of the partially reflective mirror layer to form a flat surface, and a third optical material (transparent plate 14) that protects an outer surface of the second optical material. A refractive index of the first optical material, a refractive index of the second optical material, and a refractive index of the third optical material are substantially the same.

According to this optical device, since the refractive indices of the first refractive indices of the optical material, the second optical material, and the third optical material are substantially the same for light that passes through the display light projection optical device, no refraction occurs at the boundaries between their surfaces. Therefore, when a driver sees a view ahead of the vehicle, the driver can visually recognize light that has passed through the display light projection optical device as an image at the same magnification like a regular scenery viewed through the windshield.

A configuration of the plurality of grooves (Fresnel grooves 31 to 36) of the Fresnel-shaped portion may be designed based on parameters including three-dimensional coordinates (X, Y, Z) corresponding to respective locations on the Fresnel lens portion, a normal vector (θ), and a Fresnel angle (φ).

According to this optical device, by virtue of the use of the 5-axis parameters, a Fresnel-shaped portion having necessary shapes for realizing freeform surface characteristics of the optical system can be formed easily.

While the present invention has been described with reference to a certain exemplary embodiment thereof, the scope of the present invention is not limited to the exemplary embodiment described above, and it will be understood by those skilled in the art that various changes and modifications may be made therein without departing from the scope of the present invention as defined by the appended claims.

What is claimed is:

1. An optical device comprising:
   a plate-shaped Fresnel lens portion made of a first optical material, the Fresnel lens portion comprising a Fresnel-shaped portion on one side of Fresnel lens portion in a thickness direction of the Fresnel lens portion, the Fresnel-shaped portion having a plurality of grooves, and each of the grooves has a reflecting surface; and
   a partially reflective mirror layer provided on a surface of the Fresnel-shaped portion,
   wherein the plurality of grooves of the Fresnel-shaped portion is configured such that an angle of the reflecting surface varies continuously along each of the grooves depending on a position on a circumference along the groove, so that a surface configuration of the Fresnel-shaped portion has optically freeform surface characteristics.

2. The optical device according to claim 1, wherein the Fresnel lens portion is configured to reflect display light emitted from a display unit that enters the Fresnel lens portion from the Fresnel-shaped portion on the one side such that the light is projected toward an eye point, and to transmit, in the thickness direction, external light entering the Fresnel lens portion from another side opposite the Fresnel-shaped portion on the one side.

3. The optical device according to claim 1, wherein each of the grooves has a non-uniform depth.

4. The optical device according to claim 1, wherein each of the grooves of the Fresnel-shaped portion is configured have a ring shape such that at least a distance from a central portion of the Fresnel-shaped portion to the circumference along the groove varies continuously depending on the position on the circumference.

5. The optical device according to claim 4, wherein each of the grooves of the Fresnel-shaped portion have an elliptical shape.

6. The optical device according to claim 1, further comprising:
    a second optical material as a transparent filler that fills projections and recesses of a surface of the partially reflective mirror layer to form a flat surface; and
    a third optical material that protects an outer surface of the second optical material,
    wherein a refractive index of the first optical material, a refractive index of the second optical material, and a refractive index of the third optical material are substantially the same.

7. The optical device according to claim 1, wherein a configuration of the plurality of grooves of the Fresnel-shaped portion is designed based on parameters including three-dimensional coordinates corresponding to respective locations on the Fresnel lens portion, a normal vector, and a Fresnel angle.

8. The optical device according to claim 1, wherein the surface of the Fresnel-shaped portion has a concave central portion surrounded by the plurality of grooves.

9. An optical device configured to transmit light to an eye point of a user, the optical device comprising:
    a Fresnel lens portion made of a first optical material, the Fresnel lens portion having a Fresnel-shaped portion on one side thereof in a thickness direction, the Fresnel-shaped portion having a surface with a central portion and a plurality of non-uniform depth grooves so to have optically freeform surface characteristics, a central axis being defined by the central portion in the thickness direction of the Fresnel-shaped portion; and
    a partially reflective mirror layer provided on the surface of the Fresnel-shaped portion,
    wherein each of the plurality of grooves has a reflecting surface facing inward at an angle toward the central axis, and
    wherein each of the grooves of the Fresnel-shaped portion is configured have a ring shape such that at least a distance from the central portion of the Fresnel-shaped portion to a circumference along the groove varies continuously depending on a position on the circumference.

10. The optical device according to claim 9, further comprising:
    a display unit configured to emit display light toward the Fresnel-shaped portion on the one side of the Fresnel lens portion,
    wherein the one side of the Fresnel lens portion is configured to thereby redirect the display light to project toward the eye point of the user and external light enters the Fresnel lens portion from another side thereof opposite the Fresnel-shaped portion on the one side.

11. The optical device according to claim 9, wherein the central portion of the surface of the Fresnel-shaped portion is concave.

* * * * *